3,173,959
PROCESS FOR THE PRODUCTION OF SATURATED
FATTY ALCOHOLS
Wilhelm Rittmeister, Erkrath-Unterbach, Germany, assignor to Dehydag Deutsche Hydrierwerke G.m.b.H., Dusseldorf, Germany, a corporation of Germany
No Drawing. Filed May 5, 1959, Ser. No. 810,990
Claims priority, application Germany, Mar. 19, 1954, D 17,349
7 Claims. (Cl. 260—638)

This invention relates to the production of fatty alcohols from esters formed from higher fatty acids and lower boiling point alcohols. It more particularly relates to a hydrogenation process for this purpose using a high activity copper hydrogenation catalyst.

It is known in the art to reduce fatty acid esters to fatty alcohols with hydrogen under pressure in continuous fashion over lumpy catalysts in the vapor phase as well as with slight evaporation in the so-called trickle process. It is also known to transform free fatty acids alone or in admixture with free alcohols into fatty alcohols in similar fashion. In accordance with German Patent 670,832 in its advantageous to employ high molecular alcohols as additives or diluents in this process. In the hydrogenation of fatty acids or fatty acid esters in the liquid phase, low molecular alcohols have also been used as advantageous diluents or solvents, especially when starting materials were used which are solids at normal temperatures or when the diluent was used to facilitate the separation of the powdery or pasty catalyst, which was used in large quantities, from the reaction product, that is from the fatty alcohol.

In accordance with the method of Adkins ("Reactions of Hydrogen," University of Wisconsin Press (1937), page 26, paragraph 2) it is recommended not to use the low molecular alcohols, such as methanol and ethanol, at temperatures above 200° C. and especially not at temperatures which lie above the critical temperatures of these alcohols.

Moreover, in the continuous hydrogenation of free fatty acids over lumpy catalysts, the addition of alcohols has been the purpose and the effect that prior to and during the hydrogenation, it partially esterifies the fatty acid starting material and diminishes or prevents the chemical attack on the catalyst or the apparatus material.

It is an object of this invention to provide a method for producing saturated fatty alcohols of high purity by catalytic reduction of esters of saturated or unsaturated higher fatty acids.

It is a further object to provide a method for the catalytic hydrogenation of esters of higher fatty acids to produce fatty alcohols wherein the process is conducted in the vapor phase.

These and other objects will become apparent as the description thereof proceeds.

I have now found that the addition of low molecular alcohols in the hydrogenation of low boiling point saturated or unsaturated fatty acid esters, such as methyl esters, into saturated fatty alcohols produces novel effects and advantages if the hydrogenation is carried out at temperatures between 200 and 300° C., within the catalyst chamber, preferably between 220 and 280° C., and at pressures from 100 to 1000 atmospheres gauge, preferably between 200 and 500 atmospheres gauge, with such large quantities of hydrogen that the ester under these conditions is completely or almost completely vaporized.

At the indicated pressures and temperatures such quantities of hydrogen are required that they amount to about 50 to 500 times the quantity which is theoretically needed for reduction of the fatty acid esters to saturated fatty alcohols. In industry this is accomplished by a suitable recycling of hydrogen through the hydrogenation apparatus under the reaction pressure. Only the quantity of hydrogen consumed in the hydrogenation of the ester is replaced by fresh hydrogen. A high reaction pressure is advantageous for the vaporization of the ester or the fatty alcohol because in the high pressure range the vapor pressure of these materials increases with increasing pressure. In other words, recycling of the same effective volume of hydrogen at 500 atmospheres gauge vaporizes more ester than at 200 atmospheres gauge. However, if the recycled effective gas volume is converted to the normal volume, the amount of hydrogen recycled at 500 atmospheres gauge is considerably greater than the quantity at 200 atmospheres gauge.

The reaction thus takes place in the vapor phase, wherein the ester, hydrogen and methanol pass over the lumpy catalyst as a vapor mixture. In order to accomplish this result, in a simple manner, a preheated ester and methanol mixture may be brought together in a T-joint. The hydrogen thereby entrains the vapors of the ester. While it is recognized that such esters as coconut fatty acid methyl ester could not be made to boil at the above conditions, the ester may nevertheless be completely vaporized. The theoretical considerations for this are as follows.

It is well recognized that when a foreign gas atmosphere occupies the space above a liquid, so much of the liquid vaporizes until the partial pressure of the liquid vapor in the atmosphere of the foreign gas corresponds to the vapor pressure of the liquid at the prevailing temperature. The vapor pressure of the liquid is independent of the external pressure at low pressure ranges. At higher pressure, the vapor pressure is higher than at lower pressures. Therefore, by passing a sufficient volume of hydrogen gas over the surface of a liquid ester, the entire amount may be vaporized by continuous entrainment and carrying away of the vapor above the liquid. To illustrate that the operation as theorized above actually takes place at the conditions shown, the following eexperiments were carried out with coconut fatty acid methyl ester:

2.5 liters coconut fatty acid methyl ester were heated to 240° C. at 250 atmospheres gauge, and the vapor formed thereby was entrained by a continuously flowing stream of 45 cubic meters, at standard temperature and pressure, of hydrogen per hour. The vapor mixture formed thereby was passed under the same pressure and temperature conditions first into a liquid separator and subsequently into a hydrogenation reaction chamber.

(1) Under these conditions, 0.5 liter of ester remained in the liquid separator in liquid form, whereas the remaining 2.0 liters of coconut fatty acid methyl ester passed over into the reaction chamber in vapor form together with the hydrogen.

(2) Under the above pressure conditions, 2.5 liters of coconut fatty acid methyl ester and 1.5 liters methanol, together with 40 cubic meters of hydrogen, were heated to 240° C. and passed through a liquid separator into a hydrogenation reaction chamber at the above-indicated hourly rate. In this case about 0.25 liter of ester remained in the separator in liquid form, whereas the remainder of the ester, together with the methanol and the hydrogen, passed into the reaction chamber in vapor form.

(3) Coconut fatty acid methyl ester, methanol and hydrogen were heated under the temperature and pressure conditions above indicated, except that 2.5 liters of methanol were added instead of 1.5 liters. Under these conditions, the fatty acid methyl ester was completely vaporized and no liquid ester at all separated out in the separator.

These tests conclusively show that the fatty acid ester substantially completely vaporized regardless of the pressure conditions, if a sufficient amount of methanol is added to the hydrogen entrainment gas.

Such operation with high-boiling point materials in the vapor phase or gas phase at high pressures and high temperatures is illustrated, for example, in Ullmans Encyklopadie der Technichen Chemie, published by Urban and Schwarzenberg, Munich, Germany (1956), vol. 7, p. 446, where the production of fatty alcohols is discussed.

In the hydrogenation of fatty acid esters no attack upon the catalyst or the apparatus material need be feared. If esters, such as coconut fatty acid methyl ester are hydrogenated in the vapor phase over lumpy catalysts the reaction product obtained thereby is a mixture of fatty alcohols and methanol free from catalyst. Accordingly, there would be no necessity or cause to admix a low boiling point alcohol with the ester prior to hydrogenation.

However, it was found that such an addition would bring the following advantages:

Upon addition of low molecular alcohols, the through-put of ester in the same apparatus can be considerably increased. At the same time the life of the hydrogenation contact catalyst can be considerably extended. Moreover, the character of the fatty alcohols produced in this manner is improved, particularly inasmuch as these alcohols have a very small content of hydrocarbons and yield very light-colored products upon transformation into sodium alkyl sulfates. The addition of a low molecular alcohol in the present method of operation has the consequence that more ester can be vaporized. This was proven in vaporization tests under the conditions of the process. The life of the solid, lumpy catalysts is greater the more completely the ester to be hydrogenated is vaporized.

Most advantageously, methyl esters are used as the fatty acid ester starting material, but the use of ethyl-, propyl-, isopropyl- and butyl-esters is also advantageous. The fatty acid radical of the ester may contain from, for example, eight to twenty carbon atoms or higher. Similarly, the addition of methanol is very advantageous, but ethanol, propanol, isopropanol, and butanol are also suitable for this purpose. The amount of low molecular alcohol to be added lies between 25 and 300% of the ester used as a starting material. I have found that particularly good results are obtained when using the methyl ester in the presence of methyl alcohol.

The low molecular weight alcohol which I utilize as a diluent may be the same as that which has been used to form the fatty acid ester or it may be a different alcohol. The use of the same low molecular weight alcohol is advantageous in that no separation of the diluent alcohol from that released from the ester by the hydrogenation is required at the end of the process. Thus, when I hydrogenate a methyl ester of a fatty acid I prefer to use methyl alcohol as a diluent. Similarly when I hydrogenate the propyl ester of a fatty acid, I prefer to use propyl alcohol as the diluent.

Suitable catalysts are those which are known to be useful in the production of fatty alcohols, such as copper chromite, copper zinc chromite, copper-zinc-carbonate or -oxide, either without carrier material or applied to known carrier substances such as silicic acid, pumice stone or clay.

The following examples further illustrate the process and its advantages. However, it will be understood that these examples are not intended to be limitative.

*Example I*

2 liters sperm oil fatty acid methyl ester with 3 liters methanol and 60 cubic meters hydrogen (calculated at 0° C., 760 mm.) per hour were passed over 3 kg. of a known lumpy copper-zinc-chromium contact catalyst at a temperature of 245° C. and 300 atmospheres gauge. This quantity of hydrogen is 164 times the theoretical amount required. In this reaction, the hydrogen is first heated and passed over the heated ester, thereby entraining the ester as a vapor, and the reactants pass over the catalyst in the vapor phase. Under these process conditions the residence time or reaction period was calculated as 28.5 seconds. After separating the methanol which was added and which was liberated during the hydrogenation, the reaction product had a saponification number of 0.6, an acid number of 0, an iodine number of 0.2 and a hydroxyl number of 225 and contained 0.9% hydrocarbons. The contact catalyst did not show any indications of exhaustion until a through-put of 1500 kg. of ester. Without the addition of free methanol under otherwise identical conditions, the contact catalyst showed wear after a short period of time with a through-put rate of 1.5 liters sperm oil fatty acid ester per hour and the activity of the contact catalyst was reduced to such an extent after a total through-put of 500 kg. that it had to be exchanged. Under these conditions the reaction product had a saponification number of 0.4, an acid number of 0, an iodine number of 0.5 and a hydroxyl number of 215 and on the average contained 5% hydrocarbons.

In place of the sperm oil fatty acid ester, the esters of low molecular alcohols with other animal, vegetable and also synthetic fatty acids such as coconut oil fatty acid, palm oil fatty acid, tallow fatty acid, synthetic paraffin carboxylic acids etc., were used as starting materials with similar results.

*Example II*

4 liters per hour of a mixture consisting of 2 liters sperm oil fatty acid butyl ester, 2 liters butanol and 80 cubic meters hydrogen (calculated at 0° C. and 760 mm.) was passed over 3 kg. of a copper-barium chromite contact catalyst containing silica gel at 235° C. and 500 atmospheres. This quantity of hydrogen is 200 times the theoretical amount required. After separation of the butanol, the reaction product had a hydroxyl number of 222, a saponification number of 1.0, an iodine number of 0.2 and contained 1.2% hydrocarbons. The contact catalyst did not lose its effectiveness until after a through-put of 1500 kg. sperm oil fatty acid butyl ester.

When 1.5 liters per hour of sperm oil fatty acid butyl ester were passed over the same contact catalyst under identical conditions but without the addition of butanol the reaction product, after evaporation of the liberated butanol, contained 5% hydrocarbons and the contact catalyst was exhausted after a through-put of 300 kg. sperm oil fatty acid butyl ester.

*Example III*

4 liters per hour of a mixture of 2.7 liters coconut oil fatty acid methyl ester, 1.3 liters methanol and 50 cm. hydrogen (calculated 0° C. and 760 atmospheres) were passed over 3 kg. of a known lumpy copper-zinc contact catalyst at a reaction temperature of 240° C. and at a pressure of 250 atmospheres. The quantity of hydrogen used was 99 times the theoretical amount required. After separation of the methanol, the reaction product had a saponification number of 0.5, a hydroxyl number of 287, an iodine number of 0.2 and contained 1% hydrocarbons.

The contact catalyst did not show any indications of fatigue until after a through-put of 2500 kg. coconut oil fatty acid methyl ester. When 210 liters per hour coconut oil fatty acid methyl ester were passed over the contact catalyst without the addition of free methanol, the contact catalyst was exhausted after a through-put of 900 kg. of coconut oil fatty acid methyl ester. In this case the reaction product had an average saponification number of 0.8 and contained 3 to 4% hydrocarbons.

While I have disclosed a number of specific embodiments and preferred modes of operation of my invention, it will be understood that these are for the purpose of illustrating the invention. I do not intend to be limited thereby, and various changes and modifications may be made in my invention without departing from the spirit of the disclosure or the scope of the appended claims.

In my copending application Serial No. 804,595 which is a continuation-in-part of my previously filed application Serial No. 571,376, now abandoned, I disclose a method for producing aliphatic unsaturated fatty alcohols from esters of aliphatic unsaturated fatty acids by hydrogenation with large quantities of hydrogen. The processes, however, are distinct in a number of ways in that in the present application the product is saturated; a small quantity of a high activity copper catalyst is used (1.5 liters/liter of feed/hour) and a high through-put is used in proportion to the catalyst body (15 times the catalyst body per 24 hours). In the process of the copending application, the product and starting material are unsaturated, a large quantity of a low activity zinc catalyst is used (8.2 liters/liter of feed/hour); and a low through-put is used (2 to 4 times the catalyst body per 24 hours).

This application is a continuation-in-part of my prior application Serial No. 494,821, now abandoned.

I claim:

1. In a process for producing saturated fatty alcohols by the continuous catalytic reduction of esters with hydrogen, said esters being the product of high molecular fatty acids having from 6 to 22 carbon atoms and low molecular weight alcohols having from 1 to 4 carbon atoms, the steps of admixing said ester together with 25 to 300 percent of a low molecular weight alcohol containing from 1 to 4 carbon atoms, passing an excess of preheated hydrogen at least 50 to 500 times the required theoretical amount in contact with said mixture to form a vapor phase, and passing said vapor through a body of a solid high activity copper containing hydrogenation catalyst selected from the group consisting of copper chromite, copper-barium chromite and copper-zinc chromite, carbonate and oxides, the quantity of catalyst being about 1.5 times the volume of the feed material, at temperatures between about 200 to 300° C., at elevated pressures of 100 to 1000 atmospheres and thereafter separating the saturated fatty alcohol product.

2. The process of claim 1 wherein the low molecular alcohol is methanol.

3. The process of claim 1 wherein the low molecular alcohol is butanol.

4. The process of claim 1 wherein the ester is a sperm oil fatty acid methyl ester and the low molecular weight alcohol is methanol.

5. The process of claim 1 wherein the ester is a sperm oil fatty acid butyl ester and the low molecular alcohol is butyl alcohol.

6. The process of claim 1 wherein the ester is a coconut oil fatty acid methyl ester and the low molecular alcohol is methanol.

7. The process of claim 1 wherein the lower molecular alcohol added to the ester starting material is the same as that used to form the ester.

References Cited in the file of this patent

UNITED STATES PATENTS

| | | |
|---|---|---|
| 2,156,217 | Andrews et al. | Apr. 25, 1939 |
| 2,374,379 | Rittmeister | Apr. 24, 1945 |

OTHER REFERENCES

Adkins: Reactions of Hydrogen, Univ. of Wis. Press, pp. 25–7, 97, 98 (1937).

Dreisbach: Pressure - Volume - Temperature Relationships of Organic Compounds, 3rd ed., pp. 4–6, 227, 228 (1952).

Adams (Editor): "Organic Reactions," vol. VIII (1954), Wiley and Sons, New York, pages 10–12.